United States Patent [19]

Thompson et al.

[11] 4,208,128

[45] Jun. 17, 1980

[54] INTERFEROMETER GYRO USING HETERODYNE PHASE DETECTION WITHOUT SEVERE LIGHT SOURCE COHERENCE REQUIREMENTS

[75] Inventors: David E. Thompson, Placentia; Dean B. Anderson, Whittier; Rudolf R. August, Laguna Beach; Shi-kay Yao, Brea, all of Calif.

[73] Assignee: Rockwell International Corporation, El Segundo, Calif.

[21] Appl. No.: 936,678

[22] Filed: Aug. 23, 1978

[51] Int. Cl.$^2$ .......................... G01B 9/02; G01P 9/00
[52] U.S. Cl. ................................................. 356/350
[58] Field of Search ................................ 356/350, 351

[56] References Cited

U.S. PATENT DOCUMENTS 4,135,822  1/1979  Ezekiel ................................ 356/350

*Primary Examiner*—Vincent P. McGraw

*Attorney, Agent, or Firm*—Richard A. Bachand; H. Fredrick Hamann

[57] ABSTRACT

An interferometer gyro employing a coiled optical fiber includes a pair of acousto-optic modulators to modulate first and second frequencies onto two components divided from the light of a light source. The light source need not exhibit the high degree of source coherence heretofore required, and can be an incandescent bulb in many applications. The first and second modulated light components are injected in opposite or counter-rotating directions into the optical fiber wherein they experience phase changes due to the apparent change in optical length of the optical fiber upon rotation of the fiber about an axis of sensitivity. The light components are then, after being removed from the fiber, combined and compared with the signals applied at the input. The phase difference therebetween is then established to measure the rate of rotation of the optical fiber about the axis of sensitivity.

13 Claims, 1 Drawing Figure

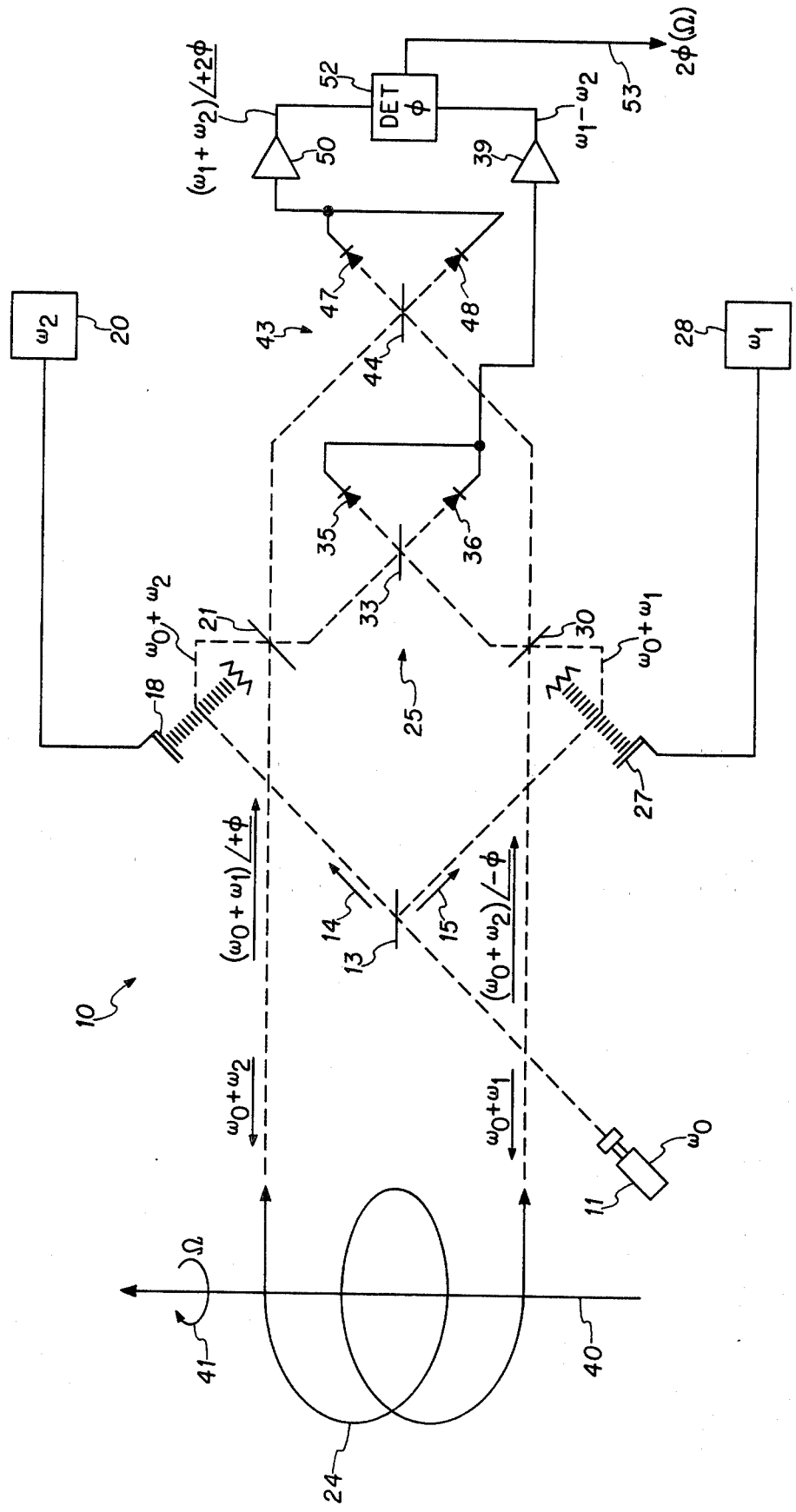

INTERFEROMETER GYRO USING HETERODYNE PHASE DETECTION WITHOUT SEVERE LIGHT SOURCE COHERENCE REQUIREMENTS

BACKGROUND OF THE INVENTION

1. Field of the Invention

This invention relates to improvements in interferometer gyroscopes and, more particularly, to interferometer gyroscopes utilizing balanced heterodyne phase detection.

2. Description of the Prior Art

Interferometer gyroscopes, or gyros, are known in the art, as exemplified by the interferometer gyro described in U.S. Pat. No. 4,013,365.

In U.S. Pat. Ser. No. 936,680, filed Aug. 23, 1978 and entitled "Interferometer Gyro Using Heterodyne Phase Detection", said application being assigned to the assignee of the instant application, and being incorporated herein by reference, an interferometer gyro was disclosed which employs a balanced heterodyne phase detection system. The gyro employs a single laser source split into two components, each passed through an acousto-optic modulator to produce signal and reference light components. The signal component was split and injected in counter-rotating directions through a fiber solenoid or coil, then, the signals, after traversing the fiber optic coil, were mixed with the reference component to form a double heterodyne phase detecting system. Because the signal component is passed through the entire length of the optic fiber, but the reference component is not injected into the optic fiber at all, the source emission coherence length should be greater than the length of the fiber optic coil. This, in some applications, may constitute a relatively severe constraint upon the light source which can be employed.

BRIEF DESCRIPTION OF THE INVENTION

In light of the above, it is an object of the invention to provide an improved interferometer gyro.

It is another object of the invention to provide an interferometer gyro of the type described which utilizes a balanced heterodyne phase detection circuit.

It is still another object of the invention to provide an interferometer gyro of the type described in which the coherence length requirements of the prior art can be greatly relaxed.

These and other objects, features and advantages will be apparent to those skilled in the art from the following detailed description when read in conjunction with the appended drawings and accompanying claims.

In its broad aspect, the invention provides an interferometer gyro which includes an optic fiber coiled about an axis about which the rate of rotation is desired to be measured. A first light component modulated with a first frequency is injected into the optic fiber in one direction. A second light component modulated with a second frequency is injected into the optic fiber in an opposite direction, and means for determining the phase difference between the first and second light components produced by the rotation of the optic fiber about its axis of sensitivity indicates the rate of rotation of the optic fiber about the axis.

BRIEF DESCRIPTION OF THE DRAWING

The invention is illustrated in the accompanying drawing in which FIG. 1 is a diagramatic view of the interferometer gyro in accordance with the principles of the invention.

DETAILED DESCRIPTION OF THE PREFERRED EMBODIMENTS

The interferometer in accordance with the invention illustrated in FIG. 1 is denoted generally by the reference numeral 10. The gyro 10 includes a source of light 11 which, for purposes of the discussion herein is illustrated as having a frequency $w_0$. The light source in the present embodiment, for reasons which will be discussed in detail below, need not be necessarily from a laser source, although such laser source can be conveniently employed. In fact, an incandescent light source can be used, if desired, without rendering the circuit inoperable.

The light from the light source 11 is directed onto a beam splitter 13 to be divided into two portions, a first portion passing through the beam splitter 13 in the direction of the arrow 14, and the other portion being reflected from the beam splitter 13 in the direction of the arrow 15. The portion 14 of the light is directed onto an acousto-optic modulator 18 such as a Bragg-type frequency shifter or a surface elastic wave zinc oxide interdigital transducer which is electrically driven with a signal of frequency $w_2$ from a frequency source 20. The output from the acousto-optic modulator 18, therefore, is a light beam having a frequency $w_0 + w_2$. It should be apparent to those skilled in the art that other types of optic modulators can be equally advantageously employed, such as, for example, electro-optic modulators and the like. The modulated beam from the acousto-optic modulator 18 is directed onto a beam splitter 21 to be partially reflected and injected into an optical path 24, and to be partially transmitted to a reference detection circuit 25.

In a similar manner, the portion of light traveling in the direction of the arrow 15 is directed onto an acousto-optic modulator 27 of similar type to the acousto-optic modulator 18. The acousto-optic modulator 27 is electrically driven by a signal of frequency $w_1$ from a frequency source 28 to produce an output light beam having a frequency of $w_0 + w_1$. The output light beam from the acousto-optic modulator 27 is directed onto a beam splitter 30 which reflects a portion of the beam to be injected into the optic path 24 and which transmits a portion of the beam therethrough to be directed to the reference detector 25.

The reference detector 25 includes a beam splitter 33 onto which light from the beam splitters 21 and 30 impinge. The light from the beam splitters 21 and 30 each are partially reflected and partially transmitted through the beam splitter 33 to fall upon photodiodes 35 and 36. The cathodes of the photodiodes 35 and 36 are interconnected, and are applied as an input to an amplifier 39 to produce an output equal to the combination of the signals received from the beam splitters 21 and 30, having a frequency $w_1 - w_2$.

The optical path 24, in a preferred embodiment, comprises a length of fiber optic material wound around an axis of sensitivity, denoted by the reference numeral 40. The optical path 24, therefore, provides apparent path lengthening and shortening to the light entering at each end of it when it is rotated about the axis of sensitivity 40, as shown by the arrow 41. The light path 24 can be established, alternatively, with mirrors or reflective surfaces in the manner described in U.S. Pat. No.

4,013,365 but, as stated, is preferably of an optic fiber material. When an optic fiber material is used, although preferably a single mode material is preferred, multimode optic fibers can be easily employed. Such optic fibers are widely commercially available, and the characteristics of which are widely known to those skilled in the art.

The portions of the light injected into the optic path 24 are removed therefrom and allowed to pass through the beam splitters 21 and 30 to a second signal detecting circuit 43. The detecting circuit 43 includes a beam splitter 44 onto each side of which the light from the optic path is permitted to impinge. The light reflected from the beam splitter 44 and transmitted therethrough is directed onto a pair of photodiodes 47 and 48, the cathodes of which are interconnected and applied as an input to an amplifier 50.

As is known in the art, when an optic path is rotated about the axis of sensitivity, the light within the path experiences an apparent lengthening and shortening of the path in its travel, resulting in a relative phase change between the components of the light passing in opposite or counter-rotating directions within the path. Thus, as shown, the light from the optic path 24 impinging upon the beam splitter 21 will be of frequency $w_0+w_1$ with phase $+\phi$ and, likewise, the light impinging upon the beam splitter 30 will be of frequency $w_0+w_2$ with phase $-\phi$. When the two light beams are compared or subtracted one from the other by the detection circuit 43 and amplified, the frequency of the signal will be $w_1-w_2$ with phase $+2/\phi$. The outputs from the amplifiers 39 and 50 can then be compared or subtracted by a phase detecting circuit 52 to produce an output 53 which represents twice the phase difference introduced onto the signal by virtue of the rotation of the optic path 24 about its axis of sensitivity.

It should be noted that the relative frequency of the signal detected by the reference signal detector 25 is the difference between the oscillators 20 and 28, or $w_1-w_2$. This frequency can easily be chosen to be within an intermediate frequency, for instance, in many applications, an intermediate frequency on the order of several kilohertz may be useful.

It should also be noted that in the embodiment described, both the frequency $w_1$ and the frequency $w_2$ when applied to the light from the light source 11, both pass entirely along the length of the optical path defined by the optical fiber 24. Therefore, any delays which are not related to the rotation of the optic path which are experienced by one of the frequencies will likely be experienced by the other. This also is in comparison to the prior art in which a first frequency was impressed upon the light source and passed through the optic path whereas a second reference frequency applied to the light source was merely made available for subsequent combination with the light source carrying the first frequency for detection. Thus, again, the frequency detected at the photodetectors was at d-c or zero frequency rather than an intermediate easily handleable frequency.

The elements of the interferometer gyro of claim 10 can be easily fabricated in accordance with integrated optic and electronic circuit techniques. Thus, with the exception of the optic fiber path 24 and the source of light used, all the elements can easily be fabricated on, for example, a substrate onto which an integrated optic circuit can be formed such as a semi-conductor material, to achieve a particularly stable interferometer device.

Although the invention has been described and illustrated with a certain degree of particularity, it is understood that the present disclosure is made by way of example only and that numerous changes in the combination and arrangement of parts may be resorted to by those skilled in the art without departing from the spirit and scope of the invention as hereinafter claimed.

What is claimed is:

1. An interferometer gyro, comprising:
    a light source;
    means for modulating one portion of said light source with a first frequency;
    means for modulating another portion of said light source with a second frequency;
    an optical path enclosing an area the rotation of which about an axis of sensitivity is desired to be measured;
    means for directing said portion modulated with said first frequency through said light path in one direction;
    means for directing said portion modulated with said second frequency through said light path in an opposite direction;
    means for combining said two portions to constitute a combined reference signal;
    means for combining after traversing said light path said two portions to constitute a combined rotation sensing signal; and
    means for determining the phase difference between said combined reference signal and said combined rotation sensing signal.

2. The interferometer gyro of claim 1 wherein said light source is a source of incoherent light.

3. The interferometer gyro of claims 1 or 2 wherein said optical path comprises a coiled optical fiber.

4. The interferometer gyro of claims 1 or 2 wherein said optical path comprises a multi-mode optical fiber.

5. The interferometer gyro of claim 1 wherein said means for determining the phase difference between said combined reference signal and said combined rotation sensing signal comprises two pairs of photodiodes, each pair arranged to receive a respective one of said combined signals, a pair of amplifiers, the inputs of which are connected to a respective pair of said photodiodes, and a phase detector connected to receive the outputs of said amplifiers.

6. An interferometer gyro comprising:
    an optic fiber coiled about an axis about which the rate of rotation of said optic fiber is desired to be measured;
    a first light component modulated with a first frequency and injected into said optic fiber in one direction;
    a second light component modulated with a second frequency and injected into said optic fiber in an opposite direction; and
    means for determining the phase difference between said first and second frequencies produced by rotation of said optic fiber about said axis to indicate the rate of rotation of said optic fiber about said axis.

7. The interferometer gyro of claim 6 wherein said first light component modulated with a first frequency and injected into said optic fiber in one direction comprises a light source, an acousto-optic modulator arranged to receive light from said light source, and an oscillator having an output at said first frequency applied to said acousto-optic modulator and means for receiving the output from said acousto-optic modulator and directing said received output into said optic fiber in said one direction, and wherein said light component modulated with a second frequency and injected into said optic fiber in an opposite direction comprises a second acousto-optic modulator arranged to receive a second portion of light from said light source, a second oscillator having an output at said second frequency and applied to said acousto-optic modulator to produce an output of said light source modulated at said second frequency, and a second means for receiving the output of said second acousto-optic modulator and directing said received output into said optic fiber in said opposite direction.

8. The interferometer gyro of claim 6 wherein said means for determining the phase difference between said first and second light frequencies comprises first and second pairs of photodiodes, said first pair of photodiodes being arranged to receive the modulated light prior to being injected into said optic fiber and said second pair of said photodiodes being arranged to receive said modulated light after it has traversed said optic fiber, first and second amplifiers connected to receive the outputs of said respective first and second pairs of photodiodes, and a phase detector connected to receive the outputs of said amplifiers and produce an output signal relatable to the phase difference therebetween.

9. The interferometer gyro of claims 7 or 8 in which said light source is an incoherent light source and in which said optic fiber is a multi-mode optic fiber.

10. An interferometer gyro comprising:
a light source;
a fiber optic coil defining a light path about an axis the rotation of said fiber optic coil about which is desired to be measured;
an integrated optic circuit comprising:
a first beam splitter to receive light from said light source to divide said light source into one and another portions;
a pair of acousto-optic modulators each receiving a respective one of said one and another portions of said source light and to modulate said received portions at respective first and second frequencies; and
reflective means for directing said one and another portions of said modulated light into a first and an opposite direction of said fiber optic coil to traverse said fiber optic coil;
and an integrated circuit comprising:
first photodiode means arranged to receive and combine said one and another portions of said modulated light before it is injected into said fiber optic coil;
second photodiode means arranged to receive and combine said one and another portions of said modulated light after it traverses said fiber optic coil;
first and second amplifiers, each connected to receive the respective outputs of said first and second photodiode means to produce an amplified signal;
means for detecting the phase difference between said amplified signals to indicate the rate of rotation of said fiber optic coil about said axis; and
first and second oscillators to produce, respectively, said first and second frequencies for application to said acousto-optic modulators, respectively.

11. The interferometer gyro of claim 10 wherein said light source comprises a laser light source.

12. The interferometer gyro of claim 10 wherein said light source comprises an incoherent light source.

13. The interferometer of claims 10, 11 or 12 in which said fiber optic coil comprises a length of multi-mode fiber optic material.

* * * * *